US011959536B2

(12) United States Patent
Hajiloo et al.

(10) Patent No.: US 11,959,536 B2
(45) Date of Patent: Apr. 16, 2024

(54) MANAGEMENT OF BODY AND WHEEL MOTION CONTROLS WITH DUAL CLUTCH DIFFERENTIAL

(71) Applicants: GM Global Technology Operations LLC, Detroit, MI (US); University of Waterloo, Waterloo (CA)

(72) Inventors: Reza Hajiloo, Waterloo (CA); Amir Khajepour, Waterloo (CA); Seyedalireza Kasaiezadeh Mahabadi, Novi, MI (US); Seyedeh Asal Nahidi, North York (CA); Bakhtiar B. Litkouhi, Washington, MI (US); Ehsan Mohammadbagher, Waterloo (CA)

(73) Assignees: GM GLOBAL TECHNOLOGY OPERATIONS LLC, Detroit, MI (US); University of Waterloo, Waterloo, CA (US)

( * ) Notice: Subject to any disclaimer, the term of this patent is extended or adjusted under 35 U.S.C. 154(b) by 159 days.

(21) Appl. No.: 17/713,716

(22) Filed: Apr. 5, 2022

(65) Prior Publication Data
US 2023/0313873 A1    Oct. 5, 2023

(51) Int. Cl.
*F16H 48/20*    (2012.01)
*F16H 48/22*    (2006.01)

(52) U.S. Cl.
CPC ............. *F16H 48/20* (2013.01); *F16H 48/22* (2013.01); *F16H 2048/204* (2013.01); *F16H 2048/205* (2013.01)

(58) Field of Classification Search
CPC ........... B60W 50/02; B60W 2050/021; B60W 2050/0215; B60W 30/02; B60W 40/08; B60W 40/10; B60W 40/12; B60W 2520/14; B60W 2520/20; B60W 2520/28; B60W 2530/20; B60W 2540/10; B60W 2720/40; F16H 48/20; F16H 48/22; F16H 2048/204; F16H 2048/205
See application file for complete search history.

(56) References Cited

U.S. PATENT DOCUMENTS 6,360,156 B1 * 3/2002 Morganroth ....... B60K 17/3505
                                                      701/72
9,296,374 B2 * 3/2016 Yamakado ........... B60W 40/114
(Continued)

*Primary Examiner* — John Kwon
*Assistant Examiner* — Johnny H Hoang
(74) *Attorney, Agent, or Firm* — Vivacqua Crane PLLC

(57) ABSTRACT

A system for managing vehicle body and wheel motion control with a dual clutch differential includes sensors and actuators disposed on the vehicle, the sensors measuring real-time static and dynamic data and the actuators altering static and dynamic behavior of the motor vehicle. A control module executes program code portions stored in memory. The program code portions receive the real-time static and dynamic data; selectively prioritize torque output from a prime mover of the vehicle through the differential to driven wheels of the vehicle to control a body and the driven wheels; model and estimate clutch torque for each clutch of the dual clutch differential; model and estimate a joint clutch torque, a tire force, and corner torque; and generate a torque output for each clutch of the dual clutch differential that is selected to maintain one or more of body control, wheel control, and stability of the motor vehicle.

20 Claims, 4 Drawing Sheets

(56) References Cited

U.S. PATENT DOCUMENTS

| | | | |
|---|---|---|---|
| 2006/0074530 A1* | 4/2006 | Meyers | B60W 10/119 |
| | | | 701/1 |
| 2017/0137012 A1* | 5/2017 | Mao | B60K 6/52 |
| 2019/0135262 A1* | 5/2019 | Gaither | B60W 20/10 |
| 2020/0217405 A1* | 7/2020 | Dumas | F16H 48/22 |
| 2023/0139179 A1* | 5/2023 | Askari | B60W 40/13 |
| | | | 701/1 |
| 2023/0140485 A1* | 5/2023 | Nahidi | B60W 40/101 |
| | | | 701/38 |
| 2023/0166722 A1* | 6/2023 | Hajiloo | B60W 30/02 |
| | | | 701/36 |
| 2023/0242131 A1* | 8/2023 | Kasaiezadeh Mahabadi | B60W 50/0205 |
| | | | 701/29.1 |

* cited by examiner

MANAGEMENT OF BODY AND WHEEL MOTION CONTROLS WITH DUAL CLUTCH DIFFERENTIAL

INTRODUCTION

The present disclosure relates to control systems for motor vehicles, and more specifically to systems and methods for accurately modeling vehicle control actions and adjusting vehicle control actions to maintain motor vehicle control in a variety of performance situations.

Static and dynamic motor vehicle control systems are increasingly being used to manage a wide variety of vehicle performance characteristics. This is especially true with respect to challenging driving scenarios involving tire slippage. In such challenging driving scenarios, control actions such as wheel and/or axle torques should be allocated in an optimal manner so that tire capacity is fully utilized in longitudinal and lateral directions. Motor vehicle body and wheel motion management is typically carried out with mechanical or electronically-controlled differentials such as limited slip differentials, open differentials, or the like.

While current systems and methods for managing body and wheel motion operate for their intended purpose, there is a need for new and improved systems and methods of managing body and wheel motion that enhance vehicle stability in complex driving scenarios and which provide increased driver control, adjust vehicle control actions to maintain expected vehicle behavior, provide increased force generation at the tire/road interface or contact patch while also maintaining or reducing cost and complexity, reducing calibration efforts, reducing weight, simplifying packaging, and while also providing increased redundancy and robustness.

SUMMARY

According to several aspects of the present disclosure a system for managing motor vehicle body and wheel motion control with a dual clutch differential includes one or more sensors disposed on the motor vehicle, the one or more sensors measuring real-time static and dynamic data about the motor vehicle. The system further includes one or more actuators disposed on the motor vehicle, the one or more actuators altering static and dynamic behavior of the motor vehicle. A control module has a processor, a memory, and input/output (I/O) ports, the control module executing program code portions stored in the memory. The program code portions include a first program code portion that receives, via the I/O ports, the real-time static and dynamic data from the one or more sensors and the one or more actuators. A second program code portion selectively prioritizes a torque output from a prime mover of the motor vehicle through the dual clutch differential to driven wheels of the motor vehicle in order to control a body and the driven wheels of the motor vehicle. A third program code portion models and estimates clutch torque for each clutch of the dual clutch differential. A fourth program code portion models and estimates a joint clutch torque, a tire force, and corner torque. A fifth program code portion generates a torque output for each clutch of the dual clutch differential, wherein the torque output to each clutch is selected to maintain one or more of body control, wheel control, and stability of the motor vehicle.

In another aspect of the present disclosure the one or more sensors further include one or more of wheel speed sensors, anti-lock braking system (ABS) sensors, steering angle sensors, inertial measurement units (IMUs), throttle position sensors, tire pressure monitoring system sensors.

In yet another aspect of the present disclosure the second program code portion further includes a program code portion that determines a slip ratio of driven wheels of the motor vehicle, and when the slip ratio is below a first threshold slip ratio value, control of the torque output is prioritized to maintain body control of the motor vehicle. When the slip ratio is above the first threshold slip ratio value and below a second slip ratio value, control of the torque output is prioritized to address both body control and wheel control. When the slip ratio is equal to or above the second slip ratio value, control of the torque output is prioritized to wheel control and clutch pressure is increased.

In still another aspect of the present disclosure the third program code portion models the dual clutch differential as a torsional spring and damper system. A wheel speed difference between clutch plates and a dynamic clutch torque equation are calculated.

In yet another aspect of the present disclosure the third program code portion further includes a model predictive control (MPC) algorithm that utilizes a cost function, vehicle body dynamics, wheel dynamics, and dual clutch differential dynamics and state and actuator constraints to determine a critical speed ratio.

In still another aspect of the present disclosure the third program portion estimates the clutch torque for each clutch of the dual clutch differential in proportion to the critical speed ratio wherein when the value of the critical speed ratio is 0 then torque is not transferred. When the value of the critical speed ratio is below zero torque is transferred to a right-wheel of the motor vehicle, and when the value of the critical speed ratio is above zero torque is transferred to a left wheel of the motor vehicle.

In yet another aspect of the present disclosure the fourth program code portion further includes a program code portion that estimates the joint clutch torque by receiving the real-time static and dynamic data about the motor vehicle and performing one or more of a coupled state estimation and a cascaded state estimation.

In still another aspect of the present disclosure the coupled state estimation further includes a program code portion that estimates clutch torque as a state vector estimated in a unified state observer subroutine in which dual clutch differential dynamics, axle torque distribution, and wheel dynamics are each calculated within the state observer subroutine from wheel speeds at each corner of the vehicle, clutch pressure, and motor torque. An output of the coupled state estimation is the state vector.

In yet another aspect of the present disclosure the cascaded state estimation further includes a program code portion that estimates dual clutch differential dynamics first and subsequently feeds estimated dual clutch differential dynamics information into a second state observer subroutine which includes axle torque distribution and wheel dynamics estimations. An output of the cascaded state estimation is a state vector.

In still another aspect of the present disclosure a method of managing motor vehicle body and wheel motion control with a dual clutch differential includes measuring, in real-time, static and dynamic data about the motor vehicle with one or more sensors disposed on the motor vehicle. The method further includes altering static and dynamic behavior of the motor vehicle with one or more actuators disposed on the motor vehicle. Static and dynamic motor vehicle information is processed through a control module, the control module having a processor, a memory, and input/output (I/O) ports, the control module executing program code portion stored in the memory. The program code portions receive, via the I/O ports, the real-time static and dynamic data from the one or more sensors and from the one or more actuators. The program code portions selectively prioritize a torque output from a prime mover of the motor vehicle through a dual clutch differential to driven wheels of the motor vehicle to control a body and the driven wheels of the motor vehicle. The program code portions model and estimate clutch torque for each clutch of the dual clutch differential, model and estimate a joint clutch torque, a tire force, and a corner torque, and generate a torque output for each clutch of the dual clutch differential. The torque output to each clutch is selected to maintain one or more of body control, wheel control, and stability of the motor vehicle.

In yet another aspect of the present disclosure the method further includes measuring, in real-time, static and dynamic data about the motor vehicle with sensors comprising: wheel speed sensors, anti-lock braking system (ABS) sensors, steering angle sensors, inertial measurement units (IMUs), throttle position sensors, tire pressure monitoring system sensors.

In still another aspect of the present disclosure the method further includes determining a slip ratio of driven wheels of the motor vehicle, and when the slip ratio is below a first threshold slip ratio value, control of the torque output is prioritized to maintain body control of the motor vehicle. When the slip ratio is above the first threshold slip ratio value and below a second slip ratio value, prioritizing control of the torque output to address both body control and wheel control. When the slip ratio is equal to or above the second slip ratio value, prioritizing control of the torque output to wheel control and clutch pressure is increased.

In yet another aspect of the present disclosure the method further includes modeling the dual clutch differential as a torsional spring and damper system, and calculating a wheel speed difference between clutch plates and a dynamic clutch torque equation.

In still another aspect of the present disclosure the method further includes executing a model predictive control (MPC) algorithm that utilizes a cost function, vehicle body dynamics, wheel dynamics, and dual clutch differential dynamics and state and actuator constraints to determine a critical speed ratio.

In yet another aspect of the present disclosure the method further includes estimating the clutch torque for each clutch of the dual clutch differential in proportion to the critical speed ratio. When the value of the critical speed ratio is 0 then torque is not transferred, when the value of the critical speed ratio is below zero torque is transferred to a right-wheel of the motor vehicle, and when the value of the critical speed ratio is above zero torque is transferred to a left wheel of the motor vehicle.

In still another aspect of the present disclosure the method further includes estimating the joint clutch torque by receiving the real-time static and dynamic data about the motor vehicle and performing one or more of a coupled state estimation and a cascaded state estimation.

In yet another aspect of the present disclosure performing the coupled state estimation further includes estimating clutch torque as a state vector estimated in a unified state observer subroutine in which dual clutch differential dynamics, axle torque distribution, and wheel dynamics are each calculated within the state observer subroutine from wheel speeds at each corner of the vehicle, clutch pressure, and motor torque. An output of the coupled state estimation is the state vector.

In still another aspect of the present disclosure performing the cascaded state estimation further includes estimating dual clutch differential dynamics first and subsequently feeding estimated dual clutch differential dynamics information into a second state observer subroutine which includes axle torque distribution and wheel dynamics estimations. An output of the cascaded state estimation is a state vector.

In yet another aspect of the present disclosure a method of managing motor vehicle body and wheel motion control with a dual clutch differential includes measuring, in real-time, static and dynamic data about the motor vehicle with one or more sensors disposed on the motor vehicle, altering static and dynamic behavior of the motor vehicle with one or more actuators disposed on the motor vehicle, and processing static and dynamic motor vehicle information through a control module. The control module has a processor, a memory, and input/output (I/O) ports, the control module executing program code portion stored in the memory. The program code portions receive, via the I/O ports, the real-time static and dynamic data from the one or more sensors and from the one or more actuators. The program code portions also selectively prioritize a torque output from a prime mover of the motor vehicle through a dual clutch differential to driven wheels of the motor vehicle to control a body and the driven wheels of the motor vehicle by executing a model predictive control (MPC) algorithm. The MPC algorithm utilizes a cost function, vehicle body dynamics, wheel dynamics, and dual clutch differential dynamics and state and actuator constraints to determine a critical speed ratio. A slip ratio of driven wheels of the motor vehicle is determined, and when the slip ratio is below a first threshold slip ratio value, control of the torque output is prioritized to maintain body control of the motor vehicle. When the slip ratio is above the first threshold slip ratio value and below a second slip ratio value, control of the torque output is prioritized to address both body control and wheel control. When the slip ratio is equal to or above the second slip ratio value, control of the torque output is prioritized to address wheel control and clutch pressure is increased. The method further models and estimates clutch torque for each clutch of the dual clutch differential, including estimating clutch torque for each clutch of the dual clutch differential in proportion to the critical speed ratio. When the value of the critical speed ratio is 0 then torque is not transferred, when the value of the critical speed ratio is below zero torque is transferred to a right-wheel of the motor vehicle, and when the value of the critical speed ratio is above zero torque is transferred to a left wheel of the motor vehicle. The method further models and estimates a joint clutch torque, a tire force, and a corner torque by performing one or more of a coupled state estimation and a cascaded state estimation and generates a torque output for each clutch of the dual clutch differential, wherein the torque output to each clutch is selected to maintain body control, wheel control, and stability of the motor vehicle.

In still another aspect of the present disclosure performing the coupled state estimation includes estimating clutch torque as a state vector estimated in a unified state observer subroutine in which dual clutch differential dynamics, axle torque distribution, and wheel dynamics are each calculated within the state observer subroutine from wheel speeds at each corner of the vehicle, clutch pressure, and motor torque. An output of the coupled state estimation is the state vector. Performing the cascaded state estimation includes estimating dual clutch differential dynamics first and subsequently feeding estimated dual clutch differential dynamics information into a second state observer subroutine which includes axle torque distribution and wheel dynamics estimations. An output of the cascaded state estimation is a state vector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
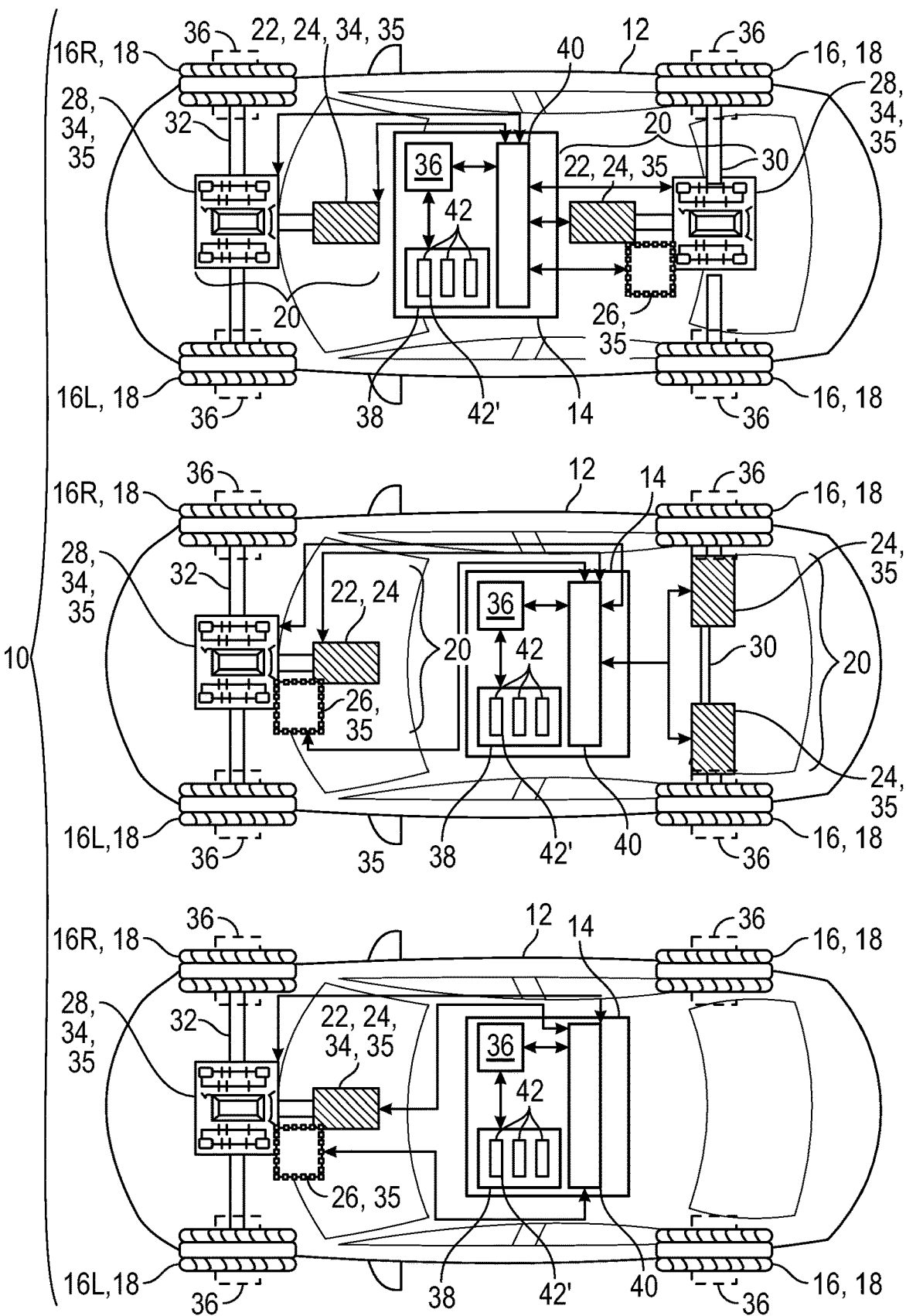
FIG. 1 is a schematic diagram of several exemplary motor vehicles equipped with a system for managing body and wheel motion control with a dual clutch differential according to an exemplary embodiment.

The following description is merely exemplary in nature and is not intended to limit the present disclosure, application, or uses.

Referring generally to the figures, the terms "forward", "rear", "inner", "inwardly", "outer", "outwardly", "above", and "below" are terms used relative to the orientation of a system 10 for managing motor vehicle 12 motion control with a dual clutch differential. Thus, "forward" refers to a direction toward a front of a motor vehicle 12, "rearward" refers to a direction toward a rear of a motor vehicle 12. "Left" refers to a direction towards a left-hand side of the motor vehicle 12 relative to the front of the motor vehicle 12. Similarly, "right" refers to a direction towards a right-hand side of the motor vehicle 12 relative to the front of the motor vehicle 12. "Inner" and "inwardly" refers to a direction towards the interior of a motor vehicle 12, and "outer" and "outwardly" refers to a direction towards the exterior of a motor vehicle 12, "below" refers to a direction towards the bottom of the motor vehicle 12, and "above" refers to a direction towards a top of the motor vehicle 12. Further, the terms "top", "overtop", "bottom", "side" and "above" are terms used relative to the orientation the system 10 and motor vehicle 12 more broadly shown in the drawings of the present application. Thus, while the orientation of the system 10 and motor vehicle 12 may change with respect to a given use, these terms are intended to still apply relative to the orientation of the components of the system 10 and motor vehicle 12 components shown in the drawings.

Referring to FIG. 1, the system 10 for managing motor vehicle 12 motion control with a dual clutch differential is shown. The system 10 includes the motor vehicle 12 and one or more controllers 14. The motor vehicle 12 shown is a car, but it should be appreciated that the motor vehicle 12 may be a van, bus, tractor-trailer, semi, Sport-Utility Vehicle (SUV), all-terrain vehicle (ATV), truck, tricycle, motorcycle, airplane, amphibious vehicle, or any other such vehicle that may be driven upon the ground without departing from the scope or intent of the present disclosure. The motor vehicle 12 includes one or more wheels 16 having tires 18 and a drivetrain 20. More specifically, FIG. 1 depicts the system 10 as used in three different exemplary motor vehicles 12 having differing drivetrain 20 layouts.

The drivetrain 20 may include a variety of components such as internal combustion engines (ICE) 22 and/or electric motors 24 or other such prime movers, transmissions 26 capable of transmitting motive power developed by the ICEs 22 and/or electric motors 24 to the wheels 16 and ultimately to the tires 18 affixed thereto. In several aspects, the transmissions 26, ICE 22, and/or electric motors 24 may be directly or indirectly coupled to one or more differentials 28. The differentials 28 are mechanical devices operable to selectively direct torque produced by the ICE 22 and/or electric motors 24 to one or more wheels 16 of the motor vehicle 12.

In an example, the motor vehicle 12 may have an ICE 22 and/or electric motors 24 acting on a rear axle 30 of the motor vehicle 12 via a transmission 26 and/or a differential 28. In another example, the motor vehicle 12 may have an ICE 22 and/or electric motors 24 acting on a front axle 32 of the motor vehicle 12 via a transmission 26 and/or a differential 28. In still another example, the motor vehicle 12 may have an ICE 22 and/or electric motors 24 acting on both rear and front axles 30, 32 via one or more transmissions 26 and one or more differentials 28. It should be appreciated, that the examples listed above are intended to be instructive rather than limiting. Accordingly, variations including similar componentry are intended to be within the scope of the present disclosure.

The motor vehicle 12 also includes a plurality of actuators 34 and a plurality of sensors 35. The actuators 34 may include a wide variety of devices which can be used to alter a state of the motor vehicle 12. Likewise, the sensors 35 may include a wide variety of devices which measure in real-time or periodically data about the motor vehicle 12. In several examples, the sensors may include, but are not limited to: wheel 16 speed sensors, throttle position sensors, steering position sensors, tire pressure monitoring sensors, inertial measurement units, semi-active damping suspension systems, global positioning system sensors, or the like. Similarly, the actuators 34 may include, but are not limited to in-plane actuators such as all-wheel drive (AWD) systems including electronically-controlled or electric AWD (eAWD) systems, as well as differentials 28 such as limited slip differentials (LSDs) including electronically-controlled LSD (eLSD) systems. In plane actuators including eAWD and eLSD systems can generate and/or modify force generation in X and/or Y directions at a tire 18 to road surface contact patch 36 within a certain predetermined tire 18 capacity. An eAWD system may transfer torque from front to rear of a motor vehicle 12 and/or from side-to-side of a motor vehicle 12, depending on configuration. Likewise, an LSD 28 and/or eLSD may transfer torque from side-to-side of the motor vehicle 12.

In further examples, the motor vehicle 12 may include a means of altering a normal force on each of the tires 18 of the motor vehicle 12 via one or more out-of-plane actuators such as active aerodynamic actuators, active suspension actuators, or the like. Active aerodynamic actuators may actively or passively alter an aerodynamic profile of the motor vehicle via one or more active aerodynamic elements such as wings, spoilers, fans or other suction devices, actively-managed Venturi tunnels, and the like. The active suspension actuators such as active dampers or the like, may alter a spring rate and/or damping characteristics of the suspension of the motor vehicle 12. In several aspects, the active dampers may be magnetorheological dampers or other such electrically, hydraulically, or pneumatically-adjustable dampers without departing from the scope or intent of the present disclosure. For the sake of simplicity in the description that follows, ICEs 22, electric motors 24, eAWD, eLSD, LSD 28, braking systems, active aerodynamic elements, active dampers, and the like will be referred to more broadly as actuators 34

The controllers 14 are non-generalized, electronic control devices having a preprogrammed digital computer or processor 36, non-transitory computer readable medium or memory 38 used to store data such as control logic, software applications, instructions, computer code, data, lookup tables, etc., and input/output (I/O) ports 40. Computer readable medium or memory 38 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 38 excludes wired, wireless, optical, or other communication links that transport transitory electrical or other signals. A non-transitory computer readable memory 38 includes media where data can be permanently stored and media where data can be stored and later overwritten, such as a rewritable optical disc or an erasable memory device. Computer code includes any type of program code, including source code, object code, and executable code. The processor 36 is configured to execute the code or instructions. The motor vehicle 12 may have controllers 14 including an engine control module, a transmission control module, a body control module, an axle monitoring module, a dedicated Wi-Fi controller, an infotainment control module, or the like. The I/O ports 40 may be configured to communicate via wired communications, wirelessly via Wi-Fi protocols under IEEE 802.11x, or the like without departing from the scope or intent of the present disclosure.

The controller 14 further includes one or more applications 42. An application 42 is a software program configured to perform a specific function or set of functions. The application 42 may include one or more computer programs, software components, sets of instructions, procedures, functions, objects, classes, instances, related data, or a portion thereof adapted for implementation in a suitable computer readable program code. The applications 42 may be stored within the memory 38 or in additional or separate memory. Examples of the applications 42 include audio or video streaming services, games, browsers, social media, etc. In other examples, the applications 42 are used to manage body control system functions, suspension control system functions, or the like in an exemplary motor vehicle 12. In a particular example, the controller 14 of the includes a dual clutch differential control and estimation application (DCDCE) 42'.

Figure 2:
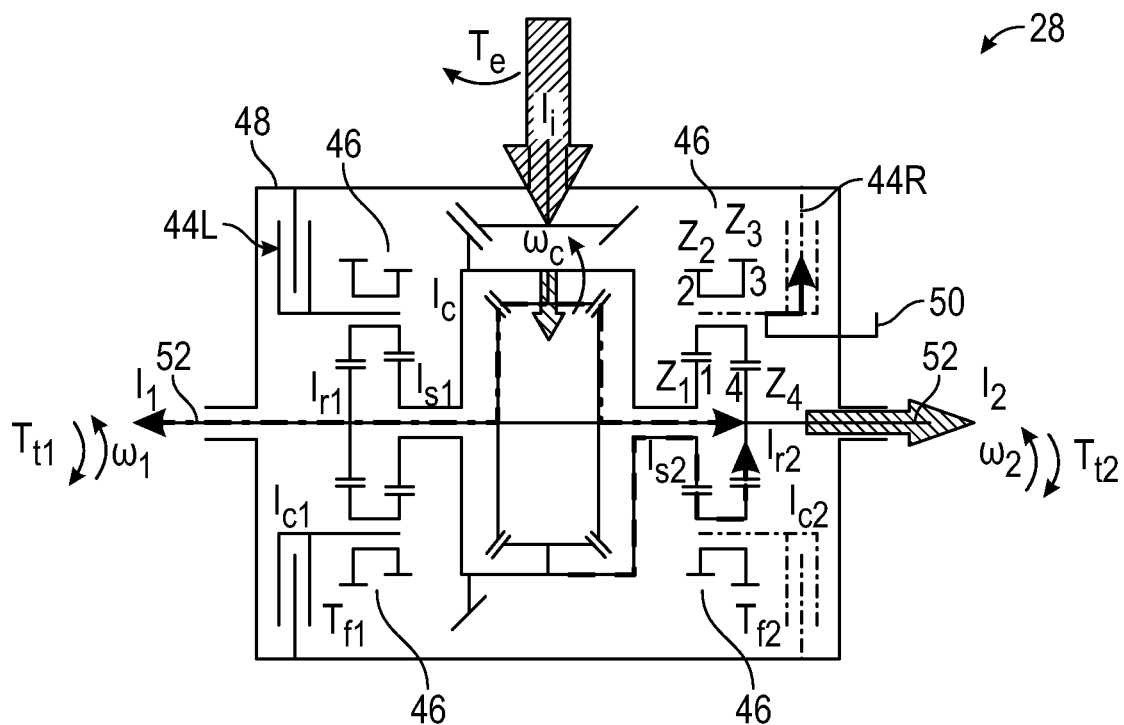
FIG. 2 is a schematic diagram of a dual clutch differential used in the system for managing body and wheel motion control of FIG. 1 according to an exemplary embodiment.

Turning now to FIG. 2 and with continuing reference to FIG. 1, a schematic view of an exemplary differential 28 is shown in further detail. In several aspects, the differential 28 of the present disclosure is a dual-clutch differential 28. The dual clutch differential 28 includes two stationary clutches 44 and two series of planetary gears 46 disposed within a differential case 48. The stationary clutches 44 are supported by carriers 50 mounted to the differential case, and the planetary gears 46 are disposed on output shafts 52 of the dual clutch differential 28. When a left clutch 44L is activated, torque is transferred to a left wheel 16L, whereas when a right clutch 44R is activated, torque is transferred to a right wheel 16R of the motor vehicle 12.

Figure 3:
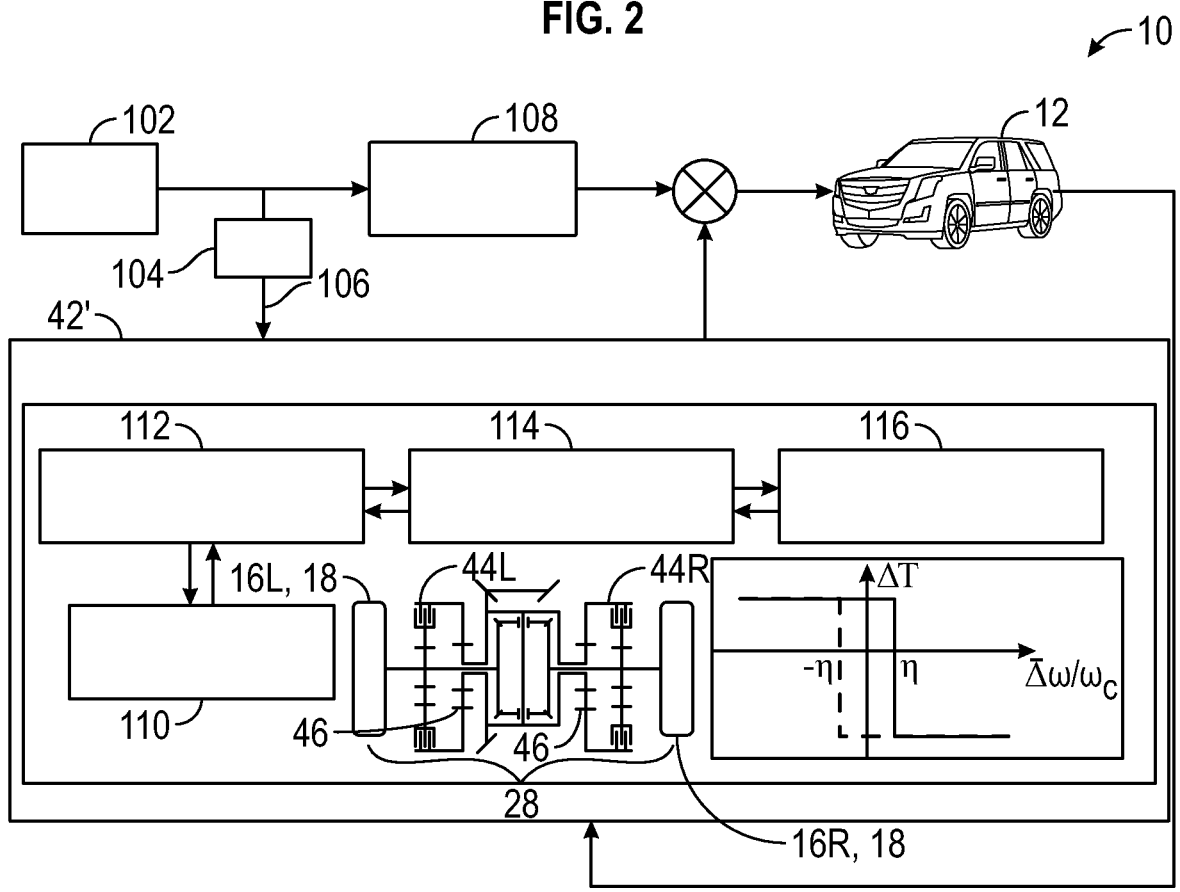
FIG. 3 is a partial functional block diagram of the system for managing body and wheel motion control with a dual clutch differential of FIG. 1 according to an exemplary embodiment.

Turning now to FIG. 3 and with continued reference to FIGS. 1 and 2, the system 10 a schematic diagram of the system 10 is shown in further detail. More specifically, an exemplary dual clutch differential control and estimation application (DCDCE) 42' is shown in detail. The DCDCE 42' receives, via the I/O ports 40, a driver input 102 to a driver control interpreter (DCI) 104. The DCI 104 reads a variety of driver inputs such as steering input, throttle input, braking input, or the like, and interprets the driver inputs before generating a desired dynamics signal 106 in the form of an actuator output. In several aspects, the DCI 104 determines boundaries for optimization and optimal coordination of actuators 34 of the motor vehicle 12. In several aspects, the DCDCE 42' includes computer control program code portions that coordinate the actuators 34 to redistribute tire 18 forces in axle and/or wheel 16 level and/or to adjust tire 18 capacity to allow increased force generation at the tire 18/road surface contact patch 36. The DCDCE 42' utilizes an output from the DCI 104 in a plurality of subroutines, program code portions and/or control devices, one or more of which may be integrated into a single controller 14 or may be integrated into distinct separate controllers 14 in electronic communication with one another. The controllers 14 include a feed-forward controller 108 which commands the actuators 34 to achieve certain transient response characteristics, provide optimal reference control actions and linearize control responses around an operation point. More specifically, the feed-forward controller 108 provides dual clutch differential 28 preemptive control signals. Preemptive control signals adjust dual clutch differential 28 outputs to comport with control signal estimates from one or more estimation modules or program code portions.

The controllers 14 further include program code portions, subroutines, or the like that define a model predictive control (MPC) portion 110, a prioritization control portion 112, a dual clutch differential 28 modeling portion 114, and a corner torque and force estimation portion 116. Combined outputs of the MPC portion 110, prioritization control portion 112, dual clutch differential 28 modeling portion 114 and corner torque and force estimation portion 116 are used to generate a DCDCE 42' output which is used as an input to control the manner of activation of the dual clutch differential 28. In several aspects, the DCDCE 42' improves the motor vehicle's 12 lateral motion while maintaining wheel 16 stability. The DCDCE 42' utilizes the dynamic performance characteristics of the dual clutch differential 28 to provide intelligent integrated control of motor vehicle 12 body and wheel 16 dynamics. Under most circumstances, wheel flare prevention is given a highest priority among body and wheel 16 control objectives. Motor vehicle 12 body and wheel 16 state information is transmitted to the DCDCE 42' within the controller 14, and the DCDCE 42' calculates an optimal control command to the dual clutch differential 28, thereby commanding an optimized torque output to each of the clutches 44 of the dual clutch differential 28.

The prioritization control portion 112 of the DCDCE 42' prioritizes output of the dual clutch differential 28 with particular situational objectives. The wheels 16 of the motor vehicle 12 may exist, broadly, in two different conditions: stable, and flare. In the stable condition, the wheels 16 are moving at a rate commensurate with the rate of movement of the vehicle 12 over the ground. In other words, the tires 18 are not sliding relative to the ground when the wheels 16 are in a stable condition. By contrast, when the wheels 16 are in a flare condition, the wheels 16 are rotating at a rate different than the rate of movement of the vehicle 12 over the ground. That is, when the wheels 16 and tires 18 of the motor vehicle are sliding either horizontally or longitudinally relative to the ground, then the wheels 16 are in a flare condition.

It should be appreciated that there is a spectrum of wheel 16 flare which may be represented by a slip rate or slip ratio κ. The slip ratio κ is an amount of slip of a tire 18 relative to a reference velocity. In an example, the slip ratio κ is defined relative to a wheel 16 center speed such that when the slip ratio κ is equal to zero, the tire 18 is free-rolling, whereas, a slip ratio κ equal to 1 defines a situation in which the tire 18 has lost traction. Values of tire 18 slip between 0 and 1 are achievable, and are used within the DCDCE 42' to assess whether body or wheel 16 control should be prioritized.

When the wheels 18 of the motor vehicle 12 are determined to be in a stable condition, the slip ratio κ has value below a first slip ratio threshold $κ_{th_1}$. In such conditions, the DCDCE 42' prioritizes body control functions, as there is very little indication of slip, and body stability is being maintained.

By contrast, when the slip ratio κ has value above the first slip ratio threshold $κ_{th_1}$, but below a second slip ratio threshold $κ_{th_2}$, then the wheels 16 are still in a stable condition but also in a wheel flare condition. That is, some slip has been detected, and the DCDCE 42' recognizes a medium slip condition which prioritizes both body control and wheel 16 control objectives. In the medium slip condition region, both body and wheel 16 control objectives are important. The DCDCE 42' partially addresses a desired yaw moment of the motor vehicle 12 while also proactively preventing increased wheel 16 slip and wheel 16 flare by decreasing clutch 44 pressure $P_c$ to reduce torque transfer to unstable wheels 16.

Finally, when wheel 16 flare occurs, the slip ratio κ has value above the first slip ratio threshold $κ_{th_1}$ and above the second slip ratio threshold $κ_{th_2}$. In wheel 16 flare conditions slip ratios that are high, that is, above the second slip ratio threshold $κ_{th_2}$, the DCDCE 42' prioritizes actuation of the dual clutch differential 28 to perform wheel 16 control or wheel 16 flare prevention functions and clutch 44 pressure $P_c$ is increased. In the high slip condition region, wheel 16 control and wheel 16 flare prevention are prioritized over body control. A speed ratio of the dual clutch exceeds a critical or threshold value and a direction of torque transfer within the differential 28 is reversed. Therefore, activation of the differential 28 may reduce torque transfer to an unstable wheel 16 and reduce or prevent wheel 16 flare.

The model predictive control (MPC) portion 110 of the DCDCE 42' produces state predictions based on initial state variables measured or estimated by sensors 35 and/or actuators 34 disposed on the motor vehicle 12. Additional estimations may also be made in order to model the impact of different factors on state variables. In cases of nonlinearity in the prediction model, a linearized model may be used for specific operational parameters using motor vehicle 12 state variable measurements and/or estimations and reference control actions. In order to produce feasible control commands for the various actuators 34, including ICEs 22, electric motors 24, transmissions 26, and one or more differentials 28, actuator 34 capacity and tire 18 capacity limits are considered in calculations. That is, a given actuator 34 in the motor vehicle 12 may have a limited range of outputs including but not limited to a limited range of motion, limitations on velocity, torque, acceleration, or the like. Similarly, tire 18 capacity may be limited by tread depth, tire 18 wear, tire 18 pressure $P_c$, tire 18 temperature, tire 18 compound, a coefficient of friction of a road surface at the contact patch 38, and the like. Accordingly, the MPC portion 110 includes an offline control logic portion that contains a formulation of the state variables of the motor vehicle 12, control objective design, and may also include an online optimization control logic portion. The MPC portion 110 further includes a cost function which is applied to decide which control actions are appropriate as outputs of the DCDCE 42' and controller 14. The cost function may be expressed as:

$$J = \sum_{k=1}^{N_p} \begin{pmatrix} (x(k) - x_d(k))^T Q(x(k) - x_d(k)) + u^T(k)R_m u(k) + \\ \Delta u^T(k)R_p\Delta u(k) + W_\beta s_\beta(k) + W_{\kappa_1} s_{\kappa_1} + W_{\kappa_2} s_{\kappa_2} \end{pmatrix}$$

where $N_p$ is the number of points in the prediction horizon, $x(k)=[\beta,r]^T$ denotes predicted states that include sideslip and yaw rate, $x_d(k)=[\beta_d,r_d]^T$ denotes desired states (desired sideslip and desired yaw rate), $u(k)=T_c(k)$ denotes control action that is the clutch 44 torque, $\Delta u(k)$ denotes control action variation; $s_\beta(k)$, $s_{\kappa_1}$, and $s_{\kappa_2}$ are non-negative slack variables that are used to change the hard constraints of sideslip and slip ratio to soft constraints to ensure that the optimization problem always has a feasible solution. These slack variables are penalized in the objective function to enforce motor vehicle 12 and wheel 16 stability. Q is the tracking weight, $R_m$ is the weight of control effort penalty, and $R_p$ is the weight of penalizing the control action variations. $W_\beta$, $W_{k1}$, $W_{k2}$ are the weights of slack variables used for the constraints on sideslip and slip ratio κ, subject to motor vehicle 12 body dynamics, wheel 16 dynamics, and dual clutch differential 28 dynamics which may be expressed as: $\dot{x}=Ax+Bu+d$ with $x=[\beta,r]^T$, $u=T_c$, where $T_c$ is the clutch 44 torque.

$$\dot{\omega}_i = \frac{1}{I_\omega}(T_i - R_e F_{x_i}) \text{ for } i: FL, FR$$

$$\dot{T}_c = f(T_c, P_c, \omega_{FL}, \omega_{FR})$$

$$A = \begin{bmatrix} \dfrac{\overline{C}_{\alpha_f}\cos(\delta) + \overline{C}_{\alpha_r}}{mv_x} & \dfrac{l_f\overline{C}_{\alpha_f}\cos(\delta) - l_r\overline{C}_{\alpha_r}}{mv_x^2} - 1 \\ \dfrac{l_f\overline{C}_{\alpha_f}\cos(\delta) - l_r\overline{C}_{\alpha_r}}{I_z} & \dfrac{l_f^2\overline{C}_{\alpha_f}\cos(\delta) + l_r^2\overline{C}_{\alpha_r}}{I_z v_x} \end{bmatrix},$$

$$B = \begin{bmatrix} 0 \\ \dfrac{l_s}{2R_e I_z} \end{bmatrix},$$

$$d = \begin{bmatrix} d_1 \\ d_2 \end{bmatrix},$$

$$d_1 = \frac{1}{mv_x}\left(\overline{F}_{yf}\cos(\delta) + \overline{F}_{yr} + F_{xf}\sin(\delta) - \overline{C}_{\alpha_f}\overline{\alpha}_f\cos(\delta) - \overline{C}_{\alpha_r}\overline{\alpha}_r - \overline{C}_{\alpha_f}\delta\cos(\delta)\right),$$

$$d_2 = \frac{1}{I_z}\left(l_f\overline{F}_{yf}\cos(\delta) - l_r\overline{F}_{yr} - l_f\overline{C}_{\alpha_f}\cos(\delta)\overline{\alpha}_f + l_r\overline{C}_{\alpha_r}\overline{\alpha}_r - l_f\overline{C}_{\alpha_f}\delta\cos(\delta)\right),$$

where $F_{yi}$ is the calculated lateral force at the operating time; $\overline{C}_{\alpha_i}$ is the sensitivity of lateral force with respect to slip angle at the operating time, calculated using partial derivatives as follows:

$$\overline{C}_{\alpha_i} = \frac{\partial F_{yi}}{\partial \alpha_i}\bigg|_{\overline{\alpha}_i}$$

The front and rear tires' slip angles are calculated as follows:

$$\alpha_f = \frac{v + l_f r}{u} - \delta, \; \alpha_r = \frac{v - l_r r}{u}$$

where m and $I_z$ are respectively the motor vehicle 12 mass and inertia about the yaw axis; $\delta$ is the steering angle; $l_f$ and $l_r$ refer to the distances from the front axle 32 to CG, and the rear axle 30 to CG; $l_s$ is the track width, $R_e$ is the effective tire 18 radius, $F_{yf}$ and $F_{yr}$ are the front and rear lateral forces; $F_{xf}$ is the front longitudinal force.

State and actuator 34 constraints may be represented as:

$$\frac{l_r r}{u} - \alpha_{r,sat} \le \beta \le \frac{l_r r}{u} + \alpha_{r,sat}$$

$$\kappa \le \kappa_{th_1} + s_{\kappa_1}(\kappa_{th_1} \le \kappa_{th_2} \le \kappa_c)$$

$$H_\beta x(k) \le G_\beta(k) + s_\beta(k)$$

$$\kappa \le \kappa_{th_1} + s_{\kappa_1}(\kappa_{th_1} \le \kappa_{th_2} \le \kappa_c)$$

$$\kappa \le \kappa_{th_2} + s_{\kappa_2}(\kappa_{th_1} \le \kappa_{th_2} \le \kappa_c)$$

$$T_{c,min} \le T_c \le T_{c,max}$$

where $s_\beta(k) \ge 0$ and $H_\beta = \begin{bmatrix} 1 & -\frac{l_r}{v_x} & 0 & 0 \\ -1 & \frac{l_r}{v_x} & 0 & 0 \end{bmatrix}$, and $G_\beta = \alpha_{r,sat}\begin{bmatrix}1\\1\end{bmatrix}$, $s_{\kappa_1}(k) \ge 0$, $s_{\kappa_2}(k) \ge 0$, $\alpha_{r,sat} = \arctan\left(\frac{3\mu F_z}{C_\alpha}\right)$.

$C_\alpha$ is the tire 18 cornering stiffness; $F_z$ is the tire 18 normal load; $\alpha$ is the slip angle.

Soft constraints on wheel 16 stability may be implemented using additional methodologies without departing from the scope or intent of the present disclosure. In several aspects, the soft constraints on wheel 16 stability may be implemented using additional or different data parameters such as slip ratio $\kappa$, wheel speed difference $\Delta\omega$, and or $R\omega - v_x$, in which R is the radius of a tire 18 equipped to the motor vehicle, $\omega$ is the wheel 16 speed, and $\kappa_x$ is the velocity of the motor vehicle 12.

Referring once more to FIGS. 2 and 3, the dual clutch differential 28 modeling portion 114 calculates relative speeds and speed differences between the clutch 44 plates using the following series of equations:

$$\omega_{s1} = \omega_c, \; \omega_{s2} = \omega_R,$$

$$\omega_c = \frac{\omega_R + \omega_L}{2},$$

$$\omega_{r1} = z_1 \omega_{s1} = z_1 \omega_c,$$

$$\omega_{r2} = z_2 \omega_{s2} = z_2 \omega_R,$$

$$\Delta\omega = \omega_{r2} - \omega_{r1},$$

$$\Delta\omega = z_2 \omega_R - z_1 \omega_c$$

$$z_1 = \frac{N_{s1}}{N_{r1}}$$

$$z_2 = \frac{N_{s2}}{N_{r2}}$$

Where $\omega_R$ is a speed of a right wheel, $\omega_L$ is a speed of a left wheel, $\omega_C$ is speed of differential housing, $\omega_{s1}$ is the speed of the gear connected to the differential housing, $\omega_{s2}$ is the speed of the gear connected to the right wheel, $\omega_{r1}$ is the speed of the first auxiliary link, $\omega_{r2}$ is the speed of the second auxiliary link, $z_1$ is the gear ratio between the internal step gears $s_1$ and $r_1$, $z_2$ is the gear ratio between the internal step gears $s_2$ and $r_2$, $\Delta\omega$ is the rotational speed difference between the first and second auxiliary links.

There are three conditions for speed differences between clutch 44 plates of the differential 28. These three conditions may be mathematically expressed as: $\Delta\omega = z_2\omega_R - z_1\omega_c > 0$ which indicates a torque transfer to the left wheel 16L; $\Delta\omega = z_2\omega_R - z_1\omega_c > 0$ which indicates a torque transfer to the right wheel 16R; and $\Delta\omega = z_2\omega_R - z_1\omega_c = 0$ which indicates no torque transfer. A critical speed ratio $$\Delta\omega = 0 \to \frac{\omega_R}{\omega_L} = \frac{z_1/2}{z_2 - z_1/2}$$

determines when the clutches 44 of the dual clutch differential 28 are activated to prevent wheel 16 flare.

In several aspects, the clutch 44 plates of the differential 28 are modeled using a torsional spring and damper model. The wheel 16 speed difference $\Delta\omega$ between the clutch 44 plates is used in the model as follows:

$$\Delta\omega = z_2\omega_R - z_1\omega_c = \left(z_2 - \frac{z_1}{2}\right)\omega_R - \frac{z_1}{2}\omega_L.$$

And an output of a dynamic clutch 44 torque equation is then calculated using the following equation:

$$\dot{T}_{c,act} = -\frac{1}{\tau_c}T_{c,act} + \frac{k_1 \tanh(k_2(\Delta\omega)^{k_3})T_{c,req}}{\tau_c} + \frac{c}{\tau_c}\frac{d\Delta\omega}{dt}.$$

Figure 4A:
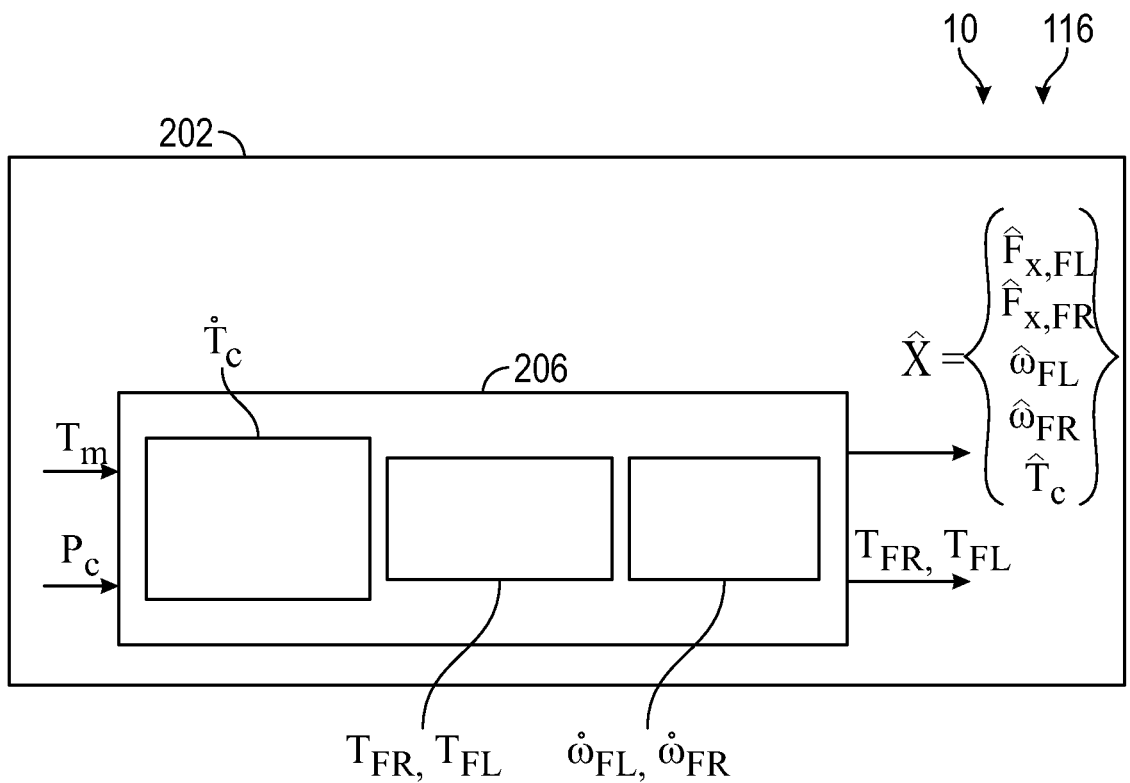
FIG. 4A is a partial functional block diagram of a portion of the system of FIG. 3 according to an exemplary embodiment.
Figure 4B:
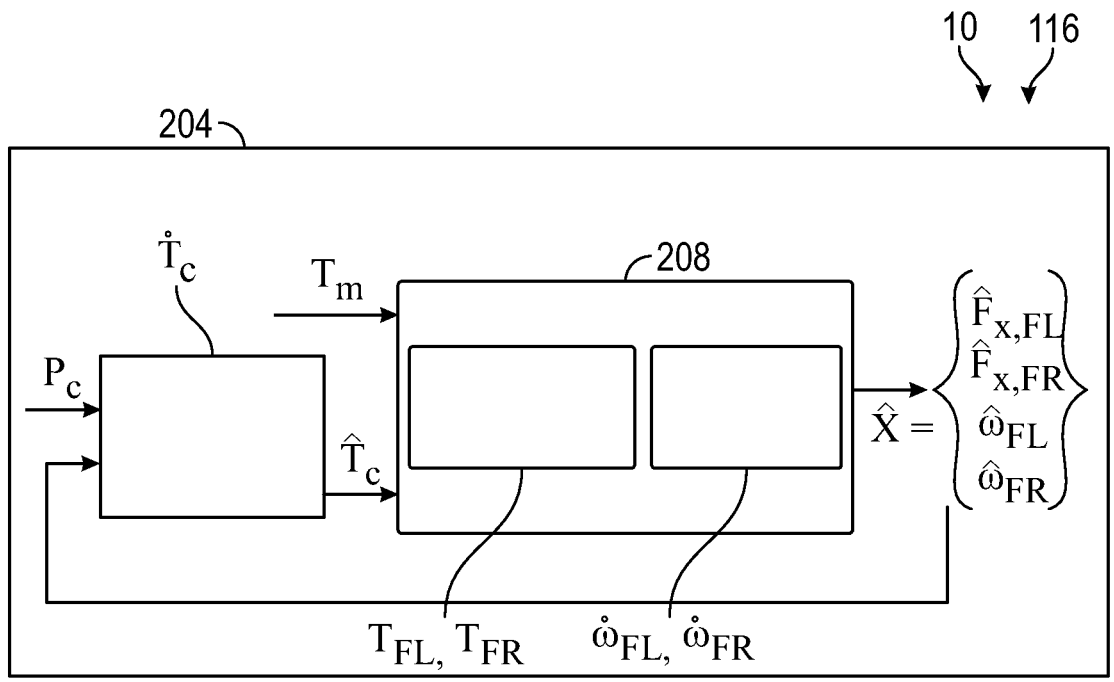
FIG. 4B is a partial functional block diagram of another portion of the system of FIG. 3 according to an exemplary embodiment.

Turning now to FIGS. 4A and 4B and with continuing reference to FIGS. 1-3 The corner torque and force estimation portion 116 generates an estimate of required joint clutch 44 torque via one or more of a coupled state estimation shown in FIG. 4A and a cascaded state estimation shown in FIG. 4B. In several aspects, an objective of the system 10 is to estimate longitudinal forces on the tires 18, clutch 44 torques, and torques at each corner of the motor vehicle 12, or more specifically, torques applied to each wheel 16 of the motor vehicle 12. To produce estimations of the longitudinal forces on the tires 18, clutch 44 torques, and corner torques, the system 10 utilizes the known dynamics of the dual clutch differential 28, the rear and front axle 30, 32 torque distribution, and wheel 16 dynamics as input. The system 10 then utilizes at least one of two distinct estimation schemes: a coupled state estimation scheme 202 and a cascaded state estimation scheme 204.

The coupled state estimation scheme 202 utilizes clutch 44 torque is a state vector $\hat{X}$ which is estimated by a unified state observer 206. The coupled state estimation scheme 202 takes the motor torque $T_m$ and clutch pressure $P_c$ as inputs to the unified state observer 206 and then generates an estimated state vector $\hat{X}$ through application of dual clutch differential 28 dynamics, axle torque distribution information, and wheel 16 dynamics. In addition to the estimated state vector $\hat{X}$, the coupled state estimation produces a front left wheel 16L torque $T_{FL}$ and a front right wheel 16R torque $T_{FR}$ to the front left and front right wheels 16 of the motor vehicle 12 in a front-wheel drive dual clutch-differential 28-equipped motor vehicle 12. Similarly, $\omega_{FR}$ and $\omega_{FL}$ are the speeds of a front right wheel 16R and a front left wheel 16L, respectively.

By contrast, the cascaded state estimation scheme 204 utilizes the known dual clutch differential 28 dynamics and clutch pressure $P_c$ to calculate an estimated clutch torque $\hat{T}_C$ first, and then feeds the estimated clutch torque $\hat{T}_C$ into a second state observer 208 as an input. In addition to the estimated clutch torque $\hat{T}_C$, the second state observer also takes the motor torque $T_m$ as an input to axle torque distribution calculations and wheel dynamics calculations. The output of the second state observer is an estimated state vector $\hat{X}$ which is then recursively and continuously fed back into the dual clutch differential dynamics calculations along with the clutch pressure $P_c$.

In a specific example, the cascaded state estimation scheme 204 utilizes corner speeds ($\omega_{FL}, \omega_{FR}$) of each wheel 16 to which torque is supplied via the differential 28, as well as clutch pressure $P_c$ and motor torque $T_m$ as inputs to system dynamics calculations. The system dynamics calculations include wheel 16 dynamics, clutch 44 dynamics, axle 30, 32 torque distribution and speed measurement calculations which may be represented as follows:

Wheel 16 dynamics:

$$\dot{\omega}_{FL} = \frac{1}{I_{\omega,FL}}(T_{FL} - R_e F_{x,FL}); \text{ and } \dot{\omega}_{FR} = \frac{1}{I_{\omega,FR}}(T_{FR} - R_e F_{x,FR});$$

Clutch 44 dynamics: $\dot{T}_c = f(T_c, P_c, \omega_{FL}, \omega_{FR})$;
Axle 30, 32 torque distribution: $T_{FR} = 0.5(nT_m + T_c)$; and $T_{FL} = 0.5(nT_m - T_c)$; and speed measurements:

$$\omega = \begin{bmatrix} \omega_{FL} \\ \omega_{FR} \end{bmatrix}.$$

The coupled state estimation scheme 202 utilizes substantially the same information as described above with respect to the cascaded state estimation scheme 204 though the precise coordination and manipulation of the data is distinct.

Figure 5:
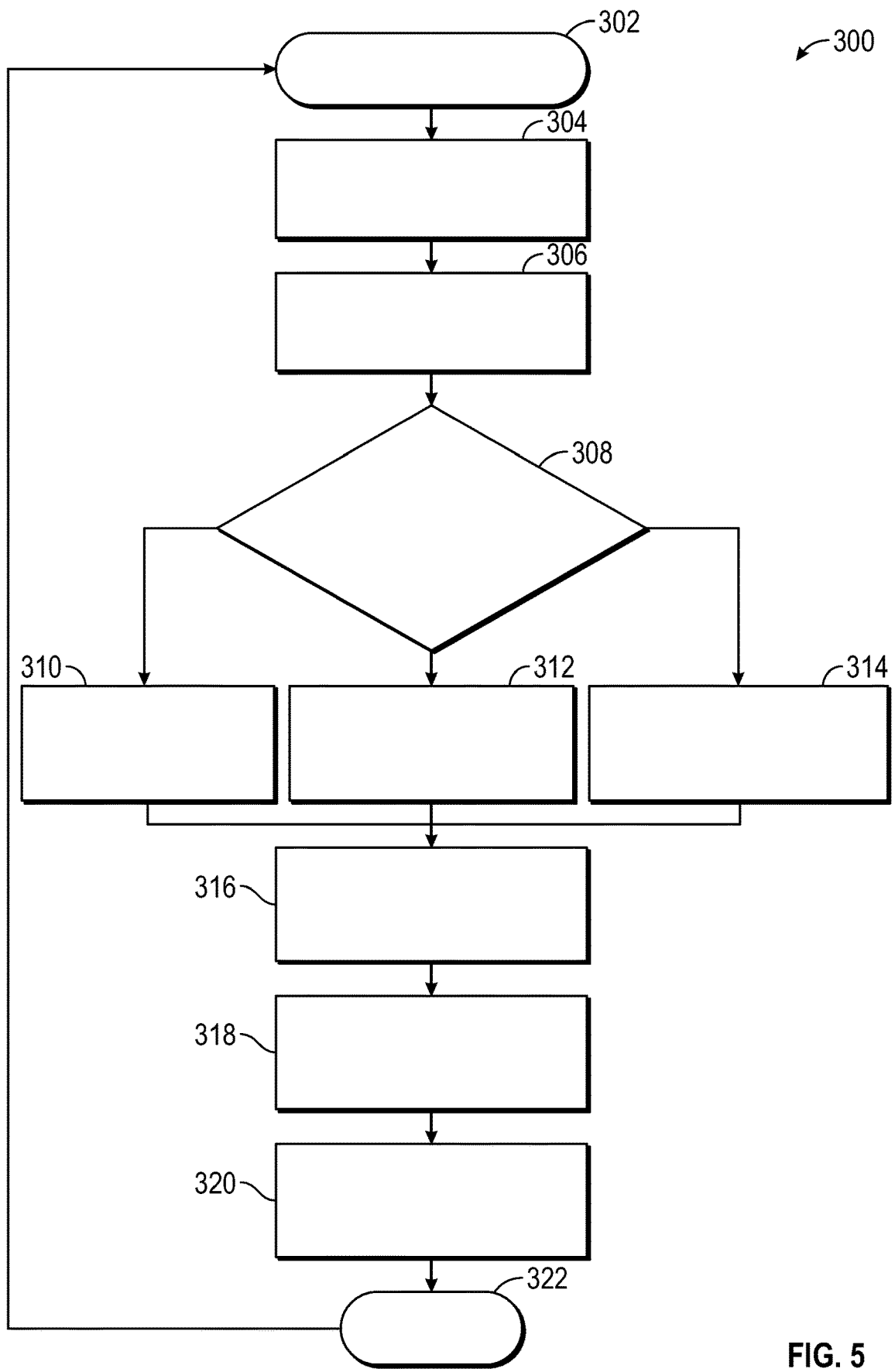
FIG. 5 is a flowchart depicting a method of managing body and wheel motion control with a dual clutch differential according to an exemplary embodiment.

Turning now to FIG. 5 and with continuing reference to FIGS. 1-4B, a method of managing motor vehicle body and wheel motion control with a dual clutch differential 28 is shown. The method 300 begins at block 302 where the system 10 receives data from one or more sensors 35 disposed on the motor vehicle 12 and measuring real-time static and dynamic data about the motor vehicle. At block 304, the method utilizes one or more actuators 34 to alter or maintain the static and dynamic behavior of the motor vehicle 12. At block 306, the method utilizes a control module 14 having a processor 36, non-memory 38, and input/output (I/O) ports 40 to perform motor vehicle body and wheel motion control algorithms or applications 42. More specifically, at block 306, the system 10 executes computer program code portions stored in the memory 38 that cause the I/O ports 40 to receive the real-time static and dynamic data from the one or more sensors 35 and actuators 34.

At block 308, the system 10 executes a second program code portion that selectively prioritizes a torque output from a prime mover of the motor vehicle 12 through the dual clutch differential 28 to driven wheels 16 of the motor vehicle 12 in order to control the body and driven wheels 16 of the motor vehicle 12. More specifically, at block 308 the system 10 calculates a slip ratio of driven wheels of the motor vehicle. When the slip ratio is below a first threshold slip ratio value, control of the torque output is prioritized at block 310 to maintain body control of the motor vehicle. By contrast, when slip ratio is above the first threshold slip ratio value and below a second slip ratio value, control of the torque output is prioritized to address both body control and wheel control at block 312. Finally, when the slip ratio is equal to or above the second slip ratio value, control of the torque output is prioritized to wheel control and clutch pressure is increased at block 314.

At block 316, the method executes a third program code portion that estimates clutch 44 torque at each clutch 44 of the dual clutch differential 28. At block 318, system 10 executes a fourth program code portion that models and estimates a joint clutch torque, a tire force, and a corner torque. At block 320, the system 10 executes a fifth program code portion that generates a torque output for each clutch 44 of the dual clutch differential 28, such that the torque output to each clutch 44 maintains one or more of body control, wheel control, and stability of the motor vehicle. At block 322, the method 300 ends and returns to block 302, where the system 10 once more receives data from the one or more sensors 35 and from the one or more actuators 34. The method 300 runs continuously while the motor vehicle 12 is being driven, and may run continuously, intermittently, periodically, or the like even when the motor vehicle 12 is stationary without departing from the scope or intent of the present disclosure.

A system and method for managing motor vehicle body and wheel motion control with a dual clutch differential of the present disclosure offers several advantages. These include the ability to take advantage of the physical and programmatic characteristics of dual clutch differentials to calculate optimal torque vectoring for integrated control of vehicle body and wheel dynamics while prioritizing body and wheel control objectives at each point in time. While substantially similar systems and methods may be applied to vehicles having fully electric propulsion systems, a differential offers certain advantages over electric motors which could, in theory, supplant the differential 28 in the technology described herein. Specifically, differentials 28 offer advantages in packaging, weight, performance at low and high speeds, over electric motors at the current time. In addition, the system 10 and method 300 described herein offer advantages in cost, ease of manufacture, as well as flexibility in application and redundancy and robustness. Substantially the same system 10 and method 300 may be used in front-wheel drive vehicles, rear-wheel drive vehicles, and/or all-wheel drive vehicles with minor modifications to variables in the programming.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for managing motor vehicle body and wheel motion control with a dual clutch differential, the system comprising:
   one or more sensors disposed on the motor vehicle, the one or more sensors measuring real-time static and dynamic data about the motor vehicle;
   one or more actuators disposed on the motor vehicle, the one or more actuators altering static and dynamic behavior of the motor vehicle;

a control module having a processor, a memory, and input/output (I/O) ports, the control module executing program code portions stored in the memory, the program code portions comprising:
a first program code portion that receives, via the I/O ports, the real-time static and dynamic data from the one or more sensors and the one or more actuators;
a second program code portion that selectively prioritizes a torque output from a prime mover of the motor vehicle through the dual clutch differential to driven wheels of the motor vehicle in order to control a body and the driven wheels of the motor vehicle;
a third program code portion that models and estimates clutch torque for each clutch of the dual clutch differential;
a fourth program code portion that models and estimates a joint clutch torque, a tire force, and corner torque; and
a fifth program code portion that generates a torque output for each clutch of the dual clutch differential, wherein the torque output to each clutch is selected to maintain one or more of body control, wheel control, and stability of the motor vehicle.

2. The system of claim 1, wherein the one or more sensors further comprise one or more of:
wheel speed sensors, anti-lock braking system (ABS) sensors, steering angle sensors, inertial measurement units (IMUs), throttle position sensors, tire pressure monitoring system sensors.

3. The system of claim 1 wherein the second program code portion further comprises:
a program code portion that determines a slip ratio of driven wheels of the motor vehicle, and when the slip ratio is below a first threshold slip ratio value, control of the torque output is prioritized to maintain body control of the motor vehicle; and
when the slip ratio is above the first threshold slip ratio value and below a second slip ratio value, control of the torque output is prioritized to address both body control and wheel control; and
when the slip ratio is equal to or above the second slip ratio value, control of the torque output is prioritized to wheel control and clutch pressure is increased.

4. The system of claim 1 wherein the third program code portion models the dual clutch differential as a torsional spring and damper system, wherein a wheel speed difference between clutch plates and a dynamic clutch torque equation are calculated.

5. The system of claim 1 wherein the third program code portion further comprises a model predictive control (MPC) algorithm that utilizes a cost function, vehicle body dynamics, wheel dynamics, and dual clutch differential dynamics and state and actuator constraints to determine a critical speed ratio.

6. The system of claim 5 wherein the third program portion estimates the clutch torque for each clutch of the dual clutch differential in proportion to the critical speed ratio wherein when a value of the critical speed ratio is 0 then torque is not transferred, when the value of the critical speed ratio is below zero torque is transferred to a right-wheel of the motor vehicle, and when the value of the critical speed ratio is above zero torque is transferred to a left wheel of the motor vehicle.

7. The system of claim 1 wherein the fourth program code portion further comprises:
a program code portion that estimates the joint clutch torque by receiving the real-time static and dynamic data about the motor vehicle and performing one or more of a coupled state estimation and a cascaded state estimation.

8. The system of claim 7 wherein the coupled state estimation further comprises:
a program code portion that estimates clutch torque as a state vector estimated in a unified state observer subroutine in which dual clutch differential dynamics, axle torque distribution, and wheel dynamics are each calculated within the state observer subroutine from wheel speeds at each corner of the vehicle, clutch pressure, and motor torque, wherein an output of the coupled state estimation is the state vector.

9. The system of claim 7 wherein the cascaded state estimation further comprises:
a program code portion that estimates dual clutch differential dynamics first and subsequently feeds estimated dual clutch differential dynamics information into a second state observer subroutine which includes axle torque distribution and wheel dynamics estimations, wherein an output of the cascaded state estimation is a state vector.

10. A method of managing motor vehicle body and wheel motion control with a dual clutch differential comprises:
measuring, in real-time, static and dynamic data about the motor vehicle with one or more sensors disposed on the motor vehicle;
altering static and dynamic behavior of the motor vehicle with one or more actuators disposed on the motor vehicle;
processing static and dynamic motor vehicle information through a control module, the control module having a processor, a memory, and input/output (I/O) ports, the control module executing program code portion stored in the memory, the program code portions:
receiving, via the I/O ports, the real-time static and dynamic data from the one or more sensors and from the one or more actuators;
selectively prioritizing a torque output from a prime mover of the motor vehicle through a dual clutch differential to driven wheels of the motor vehicle to control a body and the driven wheels of the motor vehicle;
modeling and estimating clutch torque for each clutch of the dual clutch differential;
modeling and estimating a joint clutch torque, a tire force, and a corner torque; and
generating a torque output for each clutch of the dual clutch differential, wherein the torque output to each clutch is selected to maintain one or more of body control, wheel control, and stability of the motor vehicle.

11. The method of claim 10, further comprising measuring, in real-time, static and dynamic data about the motor vehicle with sensors comprising: wheel speed sensors, anti-lock braking system (ABS) sensors, steering angle sensors, inertial measurement units (IMUs), throttle position sensors, tire pressure monitoring system sensors.

12. The method of claim 10 further comprising:
determining a slip ratio of driven wheels of the motor vehicle, and when the slip ratio is below a first threshold slip ratio value, control of the torque output is prioritized to maintain body control of the motor vehicle; and
when the slip ratio is above the first threshold slip ratio value and below a second slip ratio value, prioritizing control of the torque output to address both body control and wheel control; and when the slip ratio is equal to or above the second slip ratio value, prioritizing control of the torque output to wheel control and clutch pressure is increased.

13. The method of claim 10 further comprising modeling the dual clutch differential as a torsional spring and damper system, and calculating a wheel speed difference between clutch plates and a dynamic clutch torque equation.

14. The method of claim 10 further comprising executing a model predictive control (MPC) algorithm that utilizes a cost function, vehicle body dynamics, wheel dynamics, and dual clutch differential dynamics and state and actuator constraints to determine a critical speed ratio.

15. The method of claim 14 further comprising estimating the clutch torque for each clutch of the dual clutch differential in proportion to the critical speed ratio wherein when a value of the critical speed ratio is 0 then torque is not transferred, when a value of the critical speed ratio is below zero torque is transferred to a right-wheel of the motor vehicle, and when the value of the critical speed ratio is above zero torque is transferred to a left wheel of the motor vehicle.

16. The method of claim 10 further comprising:
estimating the joint clutch torque by receiving the real-time static and dynamic data about the motor vehicle and performing one or more of a coupled state estimation and a cascaded state estimation.

17. The method of claim 16 wherein performing the coupled state estimation further comprises:
estimating clutch torque as a state vector estimated in a unified state observer subroutine in which dual clutch differential dynamics, axle torque distribution, and wheel dynamics are each calculated within the state observer subroutine from wheel speeds at each corner of the vehicle, clutch pressure, and motor torque, wherein an output of the coupled state estimation is the state vector.

18. The method of claim 16 wherein performing the cascaded state estimation further comprises:
estimating dual clutch differential dynamics first and subsequently feeding estimated dual clutch differential dynamics information into a second state observer subroutine which includes axle torque distribution and wheel dynamics estimations, wherein an output of the cascaded state estimation is a state vector.

19. A method of managing motor vehicle body and wheel motion control with a dual clutch differential comprises:
measuring, in real-time, static and dynamic data about the motor vehicle with one or more sensors disposed on the motor vehicle;
altering static and dynamic behavior of the motor vehicle with one or more actuators disposed on the motor vehicle;
processing static and dynamic motor vehicle information through a control module, the control module having a processor, a memory, and input/output (I/O) ports, the control module executing program code portion stored in the memory, the program code portions:
receiving, via the I/O ports, the real-time static and dynamic data from the one or more sensors and from the one or more actuators;
selectively prioritizing a torque output from a prime mover of the motor vehicle through a dual clutch differential to driven wheels of the motor vehicle to control a body and the driven wheels of the motor vehicle by:
executing a model predictive control (MPC) algorithm that utilizes a cost function, vehicle body dynamics, wheel dynamics, and dual clutch differential dynamics and state and actuator constraints to determine a critical speed ratio;
determining a slip ratio of driven wheels of the motor vehicle, and when the slip ratio is below a first threshold slip ratio value, control of the torque output is prioritized to maintain body control of the motor vehicle; and
when the slip ratio is above the first threshold slip ratio value and below a second slip ratio value, prioritizing control of the torque output to address both body control and wheel control; and
when the slip ratio is equal to or above the second slip ratio value, prioritizing control of the torque output to wheel control and clutch pressure is increased;
modeling and estimating clutch torque for each clutch of the dual clutch differential, including estimating clutch torque for each clutch of the dual clutch differential in proportion to the critical speed ratio wherein when the value of the critical speed ratio is 0 then torque is not transferred, when the value of the critical speed ratio is below zero torque is transferred to a right-wheel of the motor vehicle, and when the value of the critical speed ratio is above zero torque is transferred to a left wheel of the motor vehicle;
modeling and estimating a joint clutch torque, a tire force, and a corner torque by performing one or more of a coupled state estimation and a cascaded state estimation; and
generating a torque output for each clutch of the dual clutch differential, wherein the torque output to each clutch is selected to maintain body control, wheel control, and stability of the motor vehicle.

20. The method of claim 19 wherein performing the coupled state estimation includes estimating clutch torque as a state vector estimated in a unified state observer subroutine in which dual clutch differential dynamics, axle torque distribution, and wheel dynamics are each calculated within the state observer subroutine from wheel speeds at each corner of the vehicle, clutch pressure, and motor torque, wherein an output of the coupled state estimation is the state vector; and
performing the cascaded state estimation includes estimating dual clutch differential dynamics first and subsequently feeding estimated dual clutch differential dynamics information into a second state observer subroutine which includes axle torque distribution and wheel dynamics estimations, wherein an output of the cascaded state estimation is a state vector.

* * * * *